Figure 1:
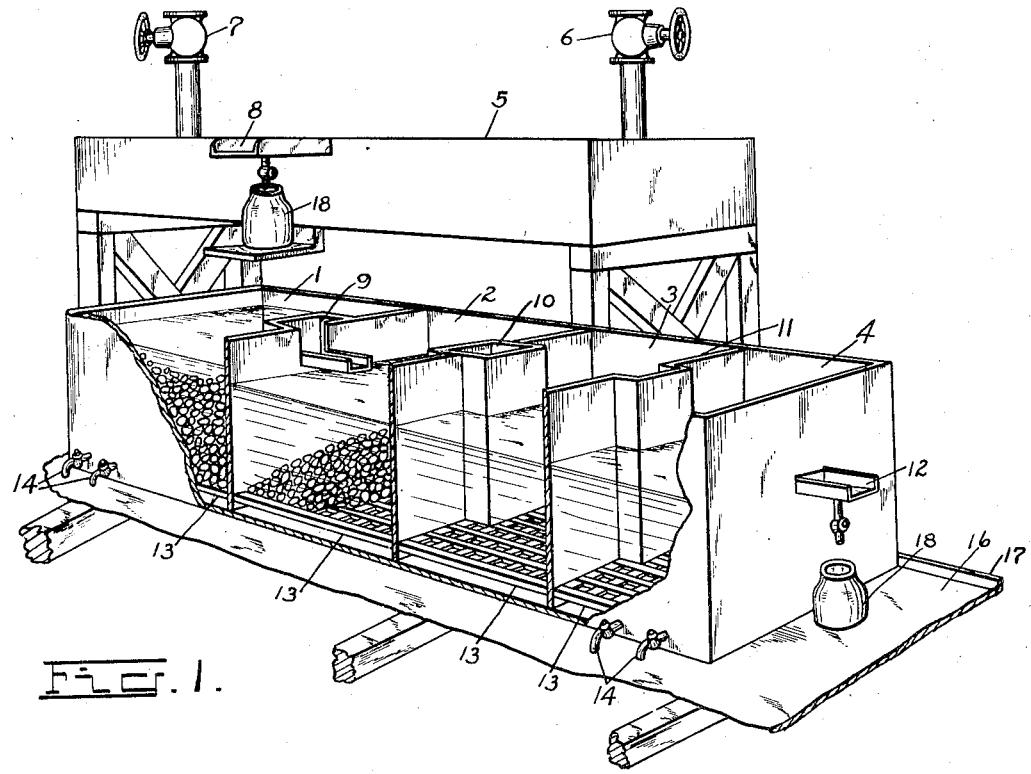

June 24, 1930. A. M. HAGEMAN ET AL 1,765,424
NEUTRALIZATION OF ACID WASTE WATERS
Filed April 25, 1929

INVENTOR
A. M. HAGEMAN
W. L. SULLIVAN
BY
ATTORNEY

Patented June 24, 1930

1,765,424

UNITED STATES PATENT OFFICE

AARON M. HAGEMAN AND WILLIAM L. SULLIVAN, OF BLOOMFIELD, NEW JERSEY, ASSIGNORS TO WESTINGHOUSE LAMP COMPANY, A CORPORATION OF PENNSYLVANIA

NEUTRALIZATION OF ACID WASTE WATERS

Application filed April 25, 1929. Serial No. 357,927.

This invention relates to the art of treating waste waters and more particularly relates to the art of treating acid waste waters to remove the acid content thereof without substantial precipitation of dissolved metal salts contained therein.

One of the objects of the present invention is to provide a method of effecting substantial neutralization of the acid content of waste waters without effecting a precipitation or separation of the soluble metal salts contained therein.

Another object of this invention is to provide a method of effecting substantial neutralization of the free acid content of a continuously flowing stream of acid waste water.

Another object of this invention is to provide an acid neutralizing agent for waste waters containing appreciable percentages of ionized sulphate compounds.

Another object of this invention is to remove the free acid content of waste waters carrying appreciable amounts of sulphuric acid.

Other objects and advantages will become apparent as the invention is more fully disclosed.

In accordance with the objects of this invention we have determined that when an acid solution containing dissolved metal salts is neutralized using methyl orange as an indicator the hydrogen ion concentration of the solution remains high enough to retain all or substantially all of the metal salts in the solution.

We have also determined that when an acid solution is subjected to the neutralizing action of an alkaline earth metal carbonate material such as limestone, marble and the like, the lowest hydrogen ion (Ph) concentration that may be obtained thereby is substantially that value which just turns methyl orange indicator from acid (red) to neutral (yellow).

We have found however that in the presence of any appreciable amount of ionized sulphate compounds in the acid waste waters, the neutralizing action of the alkaline earth metal carbonate material is substantially retarded and even inhibited by the formation of surface incrustations of relatively insoluble alkaline earth metal sulphate compounds such as calcium sulphates. When the acid content of the solution is comprised of mixed acids containing at least in part a proportion of sulphuric acid and when the solution also carries appreciable amounts of soluble metal sulphates the formation of the relatively insoluble alkaline earth metal sulphate compounds proceeds substantially as though the entire acidity of the solution was comprised of sulphuric acid and the amount of the alkaline earth metal sulphates that are formed is substantially equivalent to the free acid content of the solution calculated as sulphuric acid.

We have found that the fouling of the surface of the neutralant due to the separation of the calcium sulphate compounds may be substantially eliminated by controlling the concentration or the amount of the calcium sulphate that may be formed in such neutralization action to that amount which is soluble in the resulting solution within the temperature ranges to which the said solution is exposed.

For the purpose of the present invention we effect substantial neutralization of the free acid of waste waters by subjecting the waste waters to the neutralizing action of an alkaline earth metal carbonate material such as calcium carbonate, naturally occurring as limestone, glass house stone, marble and the like, at the conclusion of which the solution is neutral with respect to methyl orange indicator.

When the waste water carries appreciable amounts of sulphuric acid or when appreciable amounts of metal sulphates are dissolved in the acid solution we precede the final neutralization action with a preliminary neutralizing operation wherein the sulphuric or free acid content of the solution is substantially neutralized in such manner as to avoid or prevent the separation of calcium sulphate upon the surface of the calcium carbonate neutralant.

We substantially accomplish this desired result by limiting the initial acidity of the waste waters so that the amount of calcium sulphate formed in the neutralizing action is substantially equivalent to the amount which is soluble in the resultant waste water at or within the temperatures of the said waste waters. To facilitate and expedite the neutralizing action of the calcium carbonate material we prefer in addition to limiting the acidity of the solution, to employ a calcium carbonate material having intimately associated therewith another material, such as magnesium carbonate which is reactive and soluble in acid solutions to form water soluble sulphate compounds. By the use of this associated compound the degree of acidity of the solution may vary over fairly wide limits without substantially causing deleterious results. Moreover the dissolving action of the associated material continually presents new and fresh surfaces of the neutralant to the flowing stream of waste waters thus accelerating and facilitating the neutralizing action.

Such a material as contemplated by us for use as a preliminary neutralizing material would be similar in type to the naturally occurring mineral dolomite, which is an intimate mixture of calcium and magnesium carbonates having approximately 40 per cent magnesium carbonate and 60 percent calcium carbonate. Magnesium forms water soluble sulphate compounds, and although the neutralizing action of this material is less energetic than calcium carbonate alone, use of the magnesium carbonate as a neutralant in association with a calcium carbonate provides a means of effecting rapid and complete neutralization of sulphuric acid in a continuously flowing stream of waste waters and further provides a means of permitting fairly large variation in solution acidity without substantially effecting a precipitation of relatively insoluble incrustations of calcium sulphate.

Following the removal of the major portion of free sulphuric acid content the slightly acid solution is then passed over substantially pure limestone, marble, or glass house stone and the like to effect complete neutralization of the free acid content.

Figure 2:
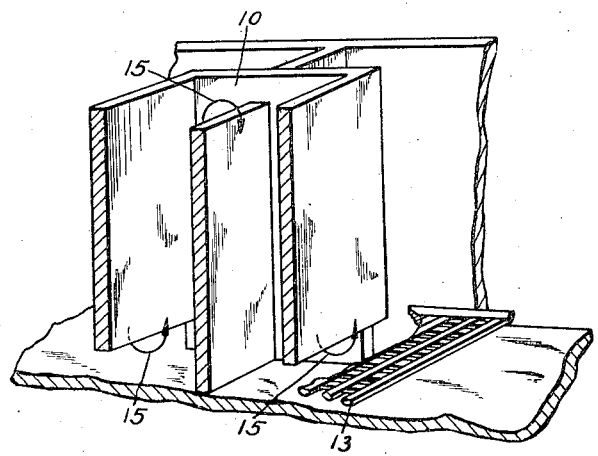

Before further disclosing the present invention reference should be had to the accompanying drawing wherein Fig. 1 discloses in perspective the construction of the apparatus useful in the practice of the present invention, and Fig. 2 discloses partly in perspective a cross sectional view of the means employed in reversing the current flow of the waste waters in the neutralizing system.

The diagrammatic sketch shown in perspective in Fig 1 illustrates the construction of the neutralizing apparatus.

It consists essentially of four large acid proof tanks, one to four inclusive, through which all of the acid waste waters must flow before being delivered to the sump leading to the natural waterway into which it is discharged. Before entering into the neutralizing system proper means are provided for controlling the maximum acidity of the solution which comprises a reservoir tank 5 into which the acid waste waters are discharged as through valve intake 6. A water connection 7 is provided in the reservoir whereby the dilution of the acid waste waters may be effected. An overflow trough 8 is provided whereby the diluted waste water is permitted to flow into the first neutralizing tank. Means 18 are provided at the overflow trough 8 for obtaining representative composite samples of the waste water before entering the neutralizing system. Identical means are provided at the effluent trough 12 for obtaining composite samples of the effluent waste water. These samples are analyzed daily for their relative acidities and the entire process controlled by the results.

The four large tanks through which all of the acid water is passed are comprised in the present instance substantially of cypress wood, the output of each tank being approximately six inches lower than the preceding one in order to provide a gravity flow for the waste waters. In each tank there is a wooden grating 13 spaced above the tank bottom of such mesh as to support the coarse particles of the neutralizing material through which the acid waste water is flowing. The size of the tank is of course dependent upon the particular volume of waste water to be handled. The size of the tanks indicated in Fig. 1 are approximately 6″ x 6″ x 6″ and are designed to handle a flow of from 80,000 to 120,000 gallons per working day.

The entire plant may be set upon acid proof mastic flooring 16 and surrounded by a fillet 17, and provided with a drain (not shown) leading into a settling tank for the purpose of providing means for flushing and washing sludge materials from the neutralizing chamber when the tanks are drained, as through stop cocks 14.

The direction of flow of the waste water through the first two tanks is downward through the neutralizing material and in the last two tanks is upward through the neutralizing material. Means for reversing the water flow is indicated in Fig. 2 wherein is shown in cross section baffle chamber 10. The direction of the water flow through the chambers 1, 2, 3 and 4 and in baffles 9, 10 and 11 being indicated by the arrows 15.

As a specific embodiment of the practice of the present invention we will describe the process employed in the neutralization of an acid waste water containing dissolved metal sulphates and a mixed acid content comprised substantially of nitric and sulphuric acids in the relative proportions of approximately 2½ parts nitric to 6 parts sulphuric by volume. The flow of water approximates 80,000 to 120,000 gallons per day. This acid waste water is obtained as an effluent from a bright dipping-room for treating small brass parts to obtain a desired color and lustre which comprises essentially immersing the brass parts in a strong acid mixture of nitric and sulphuric acids, washing the cleaned metal parts in running water and then coating them with a thin film of soap, finally drying the coated parts in hot sawdust.

The brass parts are handled in quantities in perforated or wire mesh baskets. The acid drainage is imperfect and a considerable amount of the dripping acid is carried into wash water.

The amount thereof and the concentration will be found to vary materially from day to day as the production varies. As above noted we have found that for practical purposes the use of calcium carbonate materials as a neutralant for acid solutions carrying appreciable amounts of free acid and appreciable amounts of dissolved metal sulphate compounds is most efficient, as the calcium sulphate formed thereby has an appreciable solubility in the neutralized waste waters.

We are aware that in the prior art it has been customary to employ calcium carbonate materials such as crushed marble, travertine, and the like in neutralizing acid solutions. The present applicants have found however that although crushed marble is highly reactive with free acids, in the presence of any great amounts of sulphuric acid or dissolved metal sulphates in the solution the surface of the marble, travertine, and the like calcium carbonates, become "fouled" with insoluble calcium sulphates and the neutralizing action substantially slowed up and eventually totally inhibited.

Increasing the rate of flow, such as by regulating the particle sizes of the material over and through which the acid waste water is passed does not eliminate this fouling effect. Limiting the time of exposure of the acid waste water to the neutralizing agent does not reduce this effect as calcium sulphate is precipitated from quite acid solutions.

We have found however that the fouling effect may be substantially eliminated by limiting the amount of calcium sulphate formed to not exceed the solubility of the compound in water and by employing a calcium carbonate neutralant which is comprised at least in part of a material intimately associated or admixed therewith which is reactive with sulphuric acid to form water or acid soluble compounds.

By the use of a material of this type the rate of acid neutralization is rapidly accelerated and the "fouling" effects heretofore experienced substantially eliminated.

A material falling within the scope of the present invention may be a naturally occurring carbonate mineral such as dolomite, and the like materials or it may be an artificially prepared material formed from an admixture of alkali and alkaline earth hydroxides, carbonates and the like neutralants, and compacted into briquets, and the like. For economy of operation the naturally occurring material dolomite is preferred. This material is slightly slower than straight calcium carbonate in neutralizing action on most acids but with sulphuric acid the action of the magnesium carbonate content thereof upon the sulphuric acid forming soluble salts instead of insoluble salts facilitates the neutralizing action. Moreover the crumbling action of the precipitant material due to the solution of the magnesium content substantially causes an exposure of fresh neutralant continuously to the free acid of the waste water. It is found however that the neutralizing action is not carried to completion using this material when the acidity of the solution becomes lowered, and the removal of the final residual acid content is effected by employing a more rapidly acting limestone such as marble, glass house stone and the like, in the last neutralizing chamber.

The most satisfactory size of stone useful for the purpose of our invention is from ¾ to ½ inch in the first three tanks and from ½ to ¼ inch in the last tank. Variation in the size of this stone materially effects the rate of neutralization and with any standard rate of flow through or over any definite neutralizing system this factor of particle size of neutralant should be carefully controlled.

Another factor which must be carefully controlled is the initial acidity of the waste water passing into the neutralizing system. Any material increase in the initial acidity of the waste water would materially alter the neutralizing conditions and the remaining factors of rate of flow, particle size of neutralant, surface area of neutralant, and the time interval of exposure thereto must be varied therewith to compensate for the increased acidity.

We prefer therefore to maintain constant initial acidity for any given equipment, and provide means as shown in Fig. 1 for introducing into the acid waste water, non-acid water in amounts sufficient to maintain the acidity of the waste water to not over approximately 0.3 percent. When calculated as sulphuric acid and converted into calcium sulphate the amount of calcium sulphate is approximately equal to the amount which is soluble in the waste waters within the temperature limits of the solution. The acid waste water having a controlled acidity of approximately 0.3 percent is allowed to flow freely into chamber #1, wherein it passes downwardly through the dolomite particles and upward through baffle chamber 9, and thence through a 6 inch drop into chamber #2, where the acid water is again caused to flow downwardly through the broken particles of dolomite, then upwardly into baffle chamber 10, where the direction of flow is reversed and the overflow in the manner indicated in Fig. 2 is carried by baffle chamber 10 to the bottom of chamber 3, after passing upwardly through the dolomite particles in chamber #3, the overflow is carried by baffle chamber 17, to the bottom of chamber #4, which is filled with crushed limestone, and the acid free effluent from this chamber which is neutral to methyl orange indicator is allowed to flow by gravity from effluent outlet 12 into a sump or conduit connecting with the discharge outlet.

If appreciable acidity is indicated in the test portion collected in container 18, suitable adjustment or control of the initial acidity of the waste water must be made, if the influent test sample similarly collected, indicated the acidity of the waste water is above 0.3 percent, otherwise the rate of flow through the system may be altered by changing the particle size of the crushed neutralant. It is essential in this process that the neutralant removed from the chambers 1, 2, 3 and 4 by reaction and solution in the waste water is replaced from time to time during operation and it is preferable that the replacements be frequent enough to maintain approximately the same surface area of crushed neutralant exposed to the action of the continuously moving waste water.

If desired the system may be cleansed in the manner indicated by flushing with fresh water. In order to prevent "fouling" of the neutralant material the continuous flow of water through the system should not be interrupted. When no acid wastes are to be sent through the system the neutralant should be thoroughly flushed with fresh water to remove all calcium sulphate material remaining therein, and should be filled with fresh water if allowed to remain idle.

Having broadly and specifically outlined the scope of the present invention it is obvious that there are many variations and departures that may be made therein without essentially departing from the nature thereof and such variations and departures are anticipated as may fall within the scope of the following claims.

What is claimed is:

1. The method of effecting the removal of free acid in waste waters which comprises passing said waste waters in a free flowing stream over a neutralizing agent such as dolomite, thence in a free flowing stream over substantially pure calcium carbonate materials, maintaining a constant approximate initial acidity of said waste water and regulating the rate of flow with respect to the surface area of said neutralant so that the effluent from said system is substantially neutral with respect to an acid indicator such as methyl orange.

2. The method of removing the free acid content of a moving stream of waste water which comprises means for regulating the maximum acidity of said stream, means for flowing said streams over a neutralant material such as dolomite, means for flowing said stream over a neutralant material such as limestone and means for regulating the rate of flow over said neutralant materials to effect substantial removal of said free acid content.

3. The method of effecting substantial neutralization of acid waste waters containing appreciable dissolved metal sulphates which comprises passing said waste waters in a free flowing stream over a calcium carbonate material, limiting the acidity of said waste waters so that the amount of calcium sulphate formed thereby approximately equals the amount which is soluble in said waste water.

4. The method of effecting substantial neutralization of acid waste waters containing appreciable dissolved metal sulphates which comprises passing said waste waters in a free flowing stream over a dolomitic limestone material, limiting the acidity of the waste waters so that the amount of calcium sulphate formed thereby substantially retained in solution.

5. The method of effecting substantially neutralization of a free flowing stream of acid waste waters, which comprises flowing said stream first over dolomitic limestone to effect substantial neutralization of the free acid content thereof and thereafter flowing the stream over substantially pure calcium carbonate material to reduce the hydrogen ion concentration to the desired figure.

6. The method of removing sulphuric acid from a free flowing stream of acid waste waters which comprises flowing said stream first over dolomitic limestone to effect substantial neutralization of the free acid content thereof and thereafter flowing the stream over substantially pure calcium carbonate material to reduce the hydrogen ion concentration to the desired figure.

7. The method of removing free sulphuric acid from acid waste waters which comprises limiting the acidity of said waste water to approximate 0.3 percent acidity, effecting a first neutralization by passing the waste waters over dolomitic limestone and then effecting a final neutralization by flowing the waste waters over substantially pure calcium carbonate.

8. The method of removing the free acid from a flowing stream of waste waters containing mixed acids comprised at least in part of sulphuric acid and carrying associated therewith appreciable amounts of metal sulphate compounds, which comprises limiting the acidity of said stream to approximate .3 per cent calculated as sulphuric acid, flowing said stream first over dolomitic limestone and then over substantially pure calcium carbonate material, the rate of flow being regulated to effect substantial removal of the free acid content of the stream.

In testimony whereof, we have hereunto subscribed our names this 24th day of April, 1929.

AARON M. HAGEMAN.
WILLIAM L. SULLIVAN.